United States Patent [19]
Yamaguchi et al.

[11] Patent Number: 5,258,059
[45] Date of Patent: Nov. 2, 1993

[54] GAS SEPARATION PROCESS

[75] Inventors: Toshio Yamaguchi, Narashino; Yasushi Kobayashi, Chiba, both of Japan

[73] Assignee: Toyo Engineering Corporation, Tokyo, Japan

[21] Appl. No.: 878,570

[22] Filed: May 5, 1992

[30] Foreign Application Priority Data
May 13, 1991 [JP] Japan .................. 3-135385

[51] Int. Cl.$^5$ ............................................. B01D 53/04
[52] U.S. Cl. ................................... 95/100; 95/122; 95/116
[58] Field of Search ............... 55/25, 26, 58, 62, 68, 55/74, 75, 161-163, 179, 180, 387, 389

[56] References Cited
U.S. PATENT DOCUMENTS

| 3,788,036 | 1/1974 | Lee et al. | 55/62 X |
| 4,015,956 | 4/1977 | Münzner et al. | 55/62 X |
| 4,194,890 | 3/1980 | McCombs et al. | 55/179 X |
| 4,263,018 | 4/1981 | McCombs et al. | 55/179 X |
| 4,305,734 | 12/1981 | McGill | 55/58 X |
| 4,350,500 | 9/1982 | Esselink | 55/62 X |
| 4,402,712 | 9/1983 | Benkmann | 55/62 X |
| 4,421,530 | 12/1983 | Dalton, Jr. et al. | 55/62 X |
| 4,512,778 | 4/1985 | Simonet et al. | 55/62 X |
| 4,512,779 | 4/1985 | Hay | 55/62 X |
| 4,512,780 | 4/1985 | Fuderer | 55/62 X |
| 4,636,226 | 1/1987 | Canfora | 55/179 X |
| 4,783,203 | 11/1988 | Dashi | 55/179 X |
| 4,816,039 | 3/1989 | Krishnamurthy et al. | 55/62 X |
| 4,861,351 | 8/1989 | Nicholas et al. | 55/62 X |
| 4,981,499 | 1/1991 | Hay et al. | 55/62 X |
| 5,122,164 | 6/1992 | Hirooka et al. | 55/62 X |

FOREIGN PATENT DOCUMENTS
62-47051 10/1987 Japan.

OTHER PUBLICATIONS
Derwent Abstract of Japanese Patent No. 62-47051.

Primary Examiner—Robert Spitzer
Attorney, Agent, or Firm—Flynn, Thiel, Boutell & Tanis

[57] ABSTRACT

Separation process of gaseous impurities from hydrogen gas by the known pressure swing adsorption method uses a holding column of the feed-in/feed-out sequence retaining type and at least three adsorption columns containing adsorbents. Each adsorption column is pressurized and depressurized in cycle to repeat adsorption and desorption, during which the holding column is used as an intermediate gas reservoir so that the efficiency of the separation of the impurity can be improved. In this invention, at least one of the following structures is used as the holding column:

j) at least one row of spaces divided by partition walls and arranged in series;
k) at least one hollow body; and
l) at least one row of divided compartments arranged in series.

5 Claims, 9 Drawing Sheets

$\frac{1}{2}$

GAS SEPARATION PROCESS

BACKGROUND OF THE INVENTION

1. Field of the Invention

This invention relates to a process for selectively separating gaseous components from a gaseous mixture by using an adsorbent.

2. Description of the Prior Art

As processes for the selective separation of gaseous components, especially gaseous impurity from a gaseous mixture, it has heretofore been the common practice to have the gaseous impurity adsorbed on an adsorbent in an adsorbent layer and, when the adsorbent has reached the limit of its adsorbing ability, to depressurize the adsorbent layer, followed by purging of the adsorbent layer with a gas which does not contain the gaseous impurity so much, so that the gaseous impurity is desorbed from the adsorbent to regenerate the adsorbent.

Among these processes, Japanese Patent Publication No. 47051/1987 (hereinafter abbreviated '051) discloses the following process as a gas separation process capable of minimizing the loss of the treated, i.e., purified gas.

According to this conventional process, the gaseous impurity is selectively and adiabatically adsorbed on an adsorbent. The adsorbent is depressurized and is then purged at a low pressure using a gas which may range from a gas contaminated only a little to a substantially pure gas, thereby conducting desorption of the gaseous impurity and regeneration of the adsorbent. The adsorbent is pressurized again. The conventional process features alternate and cyclic use of many columns with adsorbents so that gaseous impurity is separated from a gaseous mixture to provide a purified gas. Each cycle comprises a number of steps starting with a first adsorption column whose adsorbent has fatigued as a result of adsorption of the gaseous impurity. These steps comprise depressurizing the first adsorption column through an outlet thereof while an inlet of the first adsorption column is closed, so that gas being present in voids of the first adsorption column is allowed to expand;

introducing the thus-expanded gas to another adsorption column, which has been regenerated, through an outlet of said another adsorption column until said another adsorption column and the first adsorption column are equalized in pressure;

depressurizing the first adsorption column further through the outlet thereof to cause the gas, which is present in the voids of the first adsorption column, to expand further and, then, introducing the further-expanded gas into a packed column with an inert, nonporous column packing having a high void fraction from one end thereof;

introducing another further-expanded gas from a second adsorption column, whose adsorbent has fatigued, to the packed column through the opposite end of the packed column, whereby eliminating the first-mentioned further-expanded gas from the packed column;

depressurizing the first adsorption column to a lowest pressure through the inlet thereof, introducing a portion or all of the first-mentioned further-expanded gas, which has been eliminated from the packed column, into the first adsorption column to purge the first adsorption column, and if there is still any remaining portion of the first-mentioned further-expanded gas eliminated from the packed column, introducing the remaining portion of the first-mentioned further-expanded gas into a third adsorption column, which has been regenerated, through an inlet thereof to pressurize the third adsorption column to an intermediate level;

introducing expanded gas from a fourth adsorption column, which has fatigued, into the first adsorption column, which has already been regenerated, through the outlet while closing the inlet of the first adsorption column until the fourth adsorption column and the first adsorption column are equalized in pressure;

introducing a gas of the same quality as the purified gas from a gas stream of the same quality as the purified gas into the first adsorption column through the outlet thereof while closing the inlet of the first adsorption column until the pressure inside the first adsorption column becomes equal to the pressure of the gas stream; and introducing the gaseous mixture, which contains the gaseous impurity, into the first adsorption column through the inlet thereof and discharging the purified gas through the outlet of the first adsorption column.

The above conventional process has the merit that the loss of the purified gas can be reduced. Due to the use of the packed column, which is packed with the packing of the high void fraction, as a gas holding column, it is, however, accompanied by practical problems to be described next.

Preparation or purchase of the column packing to be placed in the packed column is not easy and, further, takes a rather long time. It is also necessary to pack the column packing on the spot. The column packing results in a substantial increase in both weight and cost of the packed column. Further, the column packing must be taken out and then packed back upon inspection of the inside of the packed column, thereby requiring time and cost.

SUMMARY OF THE INVENTION

An object of this invention is to improve the conventional process described above and, therefore, to provide a gas separation process which uses equipment easy in manufacture, installation, inspection and the like and is suitable for use in actual operation.

This invention, therefore, provides a process for separating gaseous impurities from a gaseous mixture by using a multiplicity of adsorption columns containing adsorbents, thereby to obtain a purified gas, said process including repeating alternate, cyclic adsorption and desorption as to at least three of the adsorption columns, which comprises the following steps a to i:

a) feeding the gaseous mixture into a first adsorption column through an inlet thereof, discharging the purified gas through an outlet of the first adsorption column, and terminating the feeding and discharging before the first adsorption column no longer has any remaining adsorbing ability and the purity of the purified gas falls below a target level;

b) communicating an outlet of at least one other adsorption column, whose adsorbent has been regenerated, to the outlet of the first adsorption column already subjected to the step a, whereby both the adsorption columns are equalized in pressure, and then eliminating the communication;

c) communicating the outlet of the first adsorption column, which has been subjected to step b, to a first end of the holding column which is a feed-in/feed-out sequence retaining type and contains a gas received as a result of communication of a second end of the holding column with at least one outlet of the other adsorption columns having been subjected to steps a and b like the first adsorption column, whereby the gas inside the first adsorption column is allowed to enter the holding column until the breakthrough of the components adsorbed on the adsorbent bed of the first adsorption column begins to occur in the gas; and, during the entrance of the gas from the first adsorption column into the holding column, maintaining the second end of the holding column in communication with an outlet of a second adsorption column already subjected to steps a, b and c and also to the below-described step e, whereby the second adsorption column is purged with the gas forced out of the holding column by the gas flowed into the holding column, the last-mentioned gas optionally containing a portion of the purified gas as needed;

d) closing a purge valve of the second adsorption column as needed, whereby the second adsorption column and the first adsorption column are communicated to each other and equalized in pressure, and then eliminating the communication;

e) closing the outlet of the first adsorption column already subjected to step c or d and depressurizing the first adsorption column to a lowest pressure by a purge valve provided on the side of the inlet of the first adsorption column, whereby the components adsorbed on the adsorbent bed of the first adsorption column is desorbed and eliminated;

f) communicating an outlet of a third adsorption column, which has been subjected to steps a and b like the first adsorption column, to the second end of the holding column, whereby the gas inside the third adsorption column is allowed to enter the holding column until the breakthrough of the components adsorbed on the adsorbent bed of the third adsorption column begins to occur in the gas, said gas entering the holding column optionally containing a portion of the purified gas as needed; and, during the entrance of the gas from the third adsorption column into the holding column, maintaining the first end of the holding column in communication with the outlet of the first adsorption column already subjected to step e, whereby the first adsorption column is purged with the gas forced out of the holding column by the gas flowed into the holding column, the last-mentioned gas optionally containing a portion of the purified gas as needed;

closing the purge valve of the first adsorption column as needed, whereby the first adsorption column and the third adsorption column are communicated to each other and equalized in pressure, and then eliminating the communication;

h) communicating the outlet of at least one other adsorption column, which has been subjected to step a or steps a and b like the first adsorption column, to the outlet of the first adsorption column, which has been subjected to step f or g, while closing both an inlet of said at least one other adsorption column and the inlet of the first adsorption column, whereby the gas inside said at least one other adsorption column is allowed to enter the first adsorption column, said last-mentioned gas optionally containing a portion of the purified gas as needed, to subject both said at least one other adsorption column and the first adsorption column to at least one pressure equalizing operation, and then eliminating the communication; and i) causing a gas of the same quality as the purified gas to flow into the first adsorption column, which has been subjected to step h, through the outlet thereof while closing the inlet thereof, whereby the pressure of the first adsorption column is equalized with that of the gas of the same quality as the purified gas, and then closing the outlet of the first adsorption column; wherein said holding column comprises one or a combination of the following structures:

j) at least one row of spaces divided by partition walls and arranged in series;

k) at least one hollow body; and l) at least one row of divided compartments arranged in series; and where the holding column is either said j or k, the holding column has $L^3/V$ of at least 200, L being the length of the flow passage of the holding column as expressed in terms of meters (m) and V being the volume of the flow passage of the holding column as expressed in terms of cubic meters ($m^3$); and, where the holding column is said l, the total number (N) of the divided compartments in each row is at least 20.

According to the present invention, separation of gaseous components from a gaseous mixture by adsorption can be conducted efficiently without undue wasting of purified gas. This permits the use of light-weight facilities, thereby making it easier to manufacture and install them. Further, these facilities facilitate their inspections. Accordingly, the separation can be conducted at lower cost compared to conventional separation processes.

BRIEF DESCRIPTION OF THE DRAWINGS

FIGS. 4(a), 4(b) and 4(c) are schematic drawings of one example of a holding column which is useful in the practice of this invention and has a group of spaces divided by partition walls and arranged in series. FIG. 4(c) illustrates the partition walls.

FIGS. 5(a) and 5(b) are schematic drawings of another example of a holding column which is useful in the practice of this invention and has a group of spaces divided by partition walls and arranged in series.

DETAILED DESCRIPTION OF THE PREFERRED EMBODIMENTS

The holding column of the feed-in/feed-out sequence retaining type, which is employed in the present invention, can receive, hold and feed out a gaseous mixture having a gas concentration attribution in the direction of the length of the flow passage while retaining the attribution. When the gas is caused to flow from the first adsorption column into the holding column in step c, the particular component adsorbed on the adsorbent bed in the first adsorption column (hereinafter called "the first adsorbent bed") is desorbed (The particular component is hereinafter to be referred to as "the impurity" without wishing to be limited thereto ). Accordingly, the concentration of the impurity in the gas flowing out of the first adsorption column is relatively low in an initial stage but becomes relatively high in a later stage. The gas flowing into the holding column, therefore, has a concentration gradient with respect to the impurity. In other words, the gas flowed in earlier has a lower impurity concentration. In step f, the gas having the abovedescribed concentration gradient is caused to flow in the direction opposite to the direction of the same gas flowed into the holding column so that the first adsorption column is purged. The impurity on the first adsorption bed is eliminated further by this purging. The gas flowing into the first adsorption column has a concentration gradient such that the concentration of the impurity is high at the beginning but gradually becomes lower. Therefore, the first adsorbent bed is effected to purge with the relatively contaminated gas while the contamination of the first adsorbent bed is substantial but with the less contaminated, i.e., cleaner gas as the first adsorbent bed becomes cleaner. It is to be noted that economical and efficient purging is feasible.

Examples of the holding column employed in this invention will hereinafter be described concerning some of the accompanying drawings.

First and second examples of holding columns divided by partition walls and having rows of spaces arranged in series will be described first concerning FIGS. 4(a) through 4(c) and FIGS. 5(a) through 5(b).

Figure 4A:
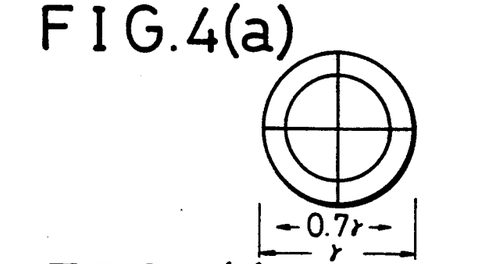
FIG. 4(a) is a transverse cross-section.
Figure 4B:
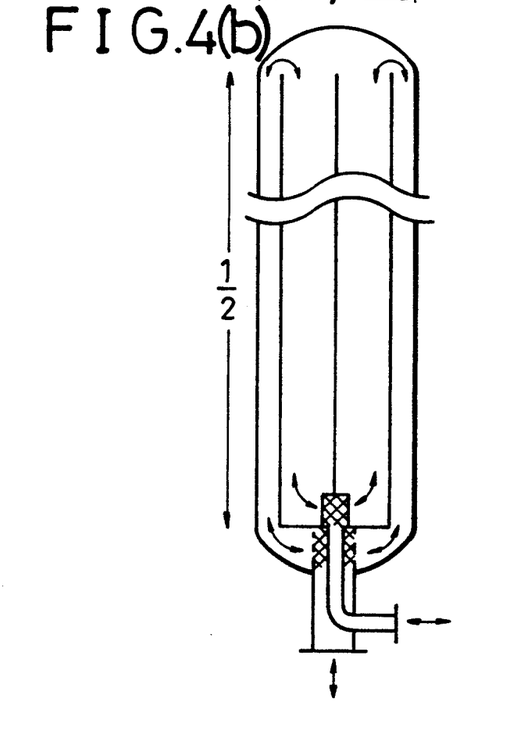
FIG. 4(b) is a vertical crosssection.
Figure 4C:
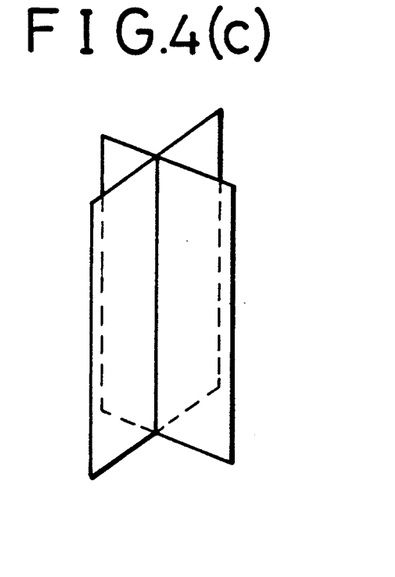

FIG. 4(a) is a simplified schematic vertical crosssection of the first example of the holding column (hereinafter referred to as "the first holding column"), while FIG. 4(b) is a simplified schematic transverse cross-section of the first holding column. The first holding column has a double-walled tubular structure formed of an outer tube and an inner tube as shown in FIGS. 4(a) and 4(b). The inside of the first holding column is divided further by partition walls depicted in FIG. 4(c), so that the inside of the first holding column is divided into 8 sections. Gas flows into the first holding column through a bottom portion and then flows out of the first holding column through the bottom portion. As a consequence, the first holding column exemplified here comprises four rows of two spaces arranged in series; said four rows being isolated by the partition walls, respectively. The length L of each gas flow passage is twice the length (L/2) of the inner tube and volume V of each row is a quarter of the whole internal volume (4 V) of the first holding column. Gas inlet and outlet, both provided in the bottom portion of the first holding column, are each provided with a gas spreader which, for example, is provided a number of apertures.

Figures 5A, 5B:
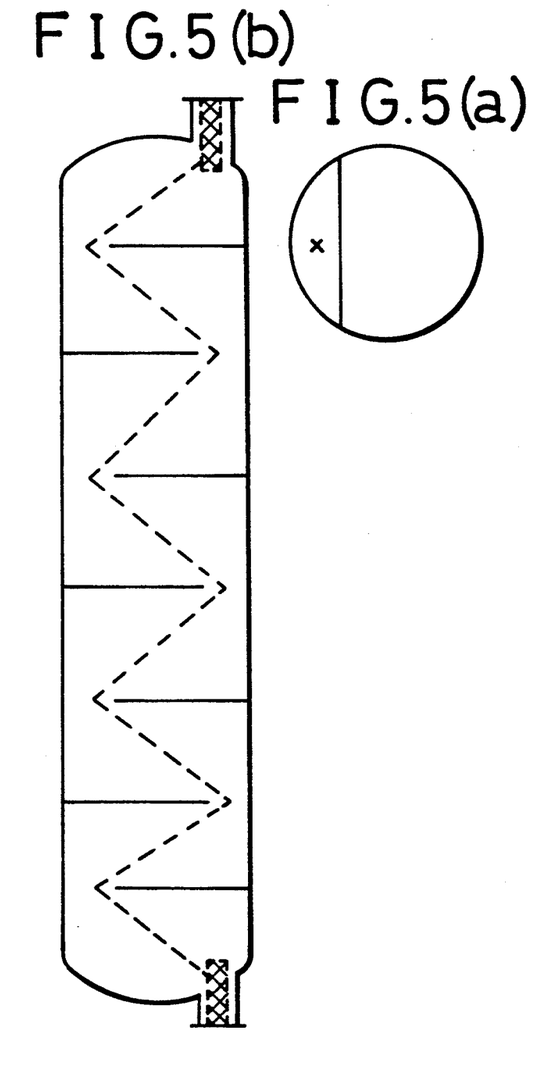
FIG. 5(a) is a transverse cross-section at the position of a baffle.
FIG. 5(b) is a vertical cross-section.

FIG. 5(a) is a simplified schematic transverse crosssection of the second example of the holding column (hereinafter referred to as "the second holding column") taken at the position of a baffle, whereas FIG. 5(b) is a simplified schematic vertical cross-section of the second holding column. As is seen from these drawings, the inside of the second holding column is divided by seven baffles so that the baffles consist of a group of eight spaces arranged in series. Since gas is allowed to flow in and out at both ends, the second holding column defines a single row of eight spaces divided by the baffles and arranged in series. In this example, the volume V is equal to the whole volume of the second holding column. A gas flow passage is indicated by a dashed zigzag line in FIG. 5(b). The second holding column is designed in such a way that the entire length of the gas flow passage becomes equal to L. The length of the gas flow passage is measured assuming that, as is indicated by the mark "X" in FIG. 5(a), each turning point of the gas flow passage is located at the center of a cross-section (i.e., the center of gravity of the crosssectional area) of the flow passage defined by the edge of corresponding baffle and the wall of the second holding column. Each of the gas inlet and outlet, which are formed at the both ends of the second holding column, is provided with a gas spreader.

Third to fifth examples of holding columns with at least a single row of space will next be described concerning FIG. 6 to FIG. 8.

Figure 6:
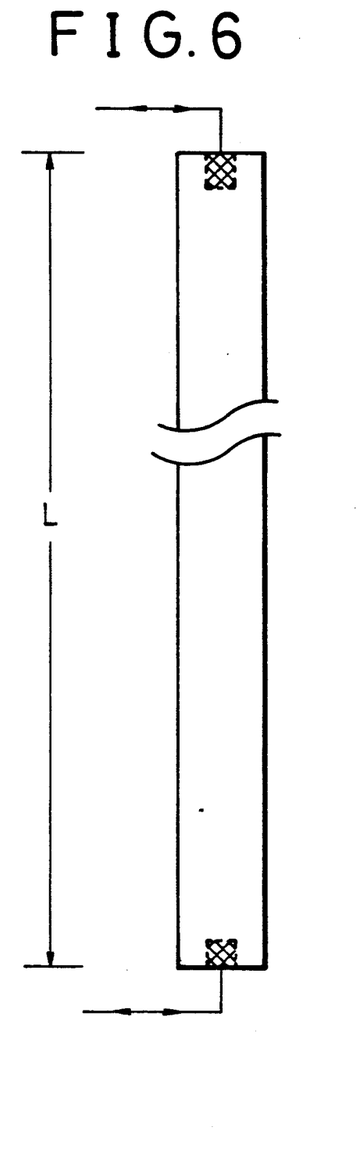
FIG. 6 is a schematic view of a further holding column useful in the practice of this invention and constructed of a single tubular hollow body.

FIG. 6 is a simplified schematic vertical cross-section of the third example of the holding column (hereinafter referred to as "the third holding column"). The third holding column is constructed of a single piece of a tubular hollow body. In this example, the length and volume of the tubular hollow body correspond to the length L and volume V of the gas flow passage, respectively.

Figure 7:
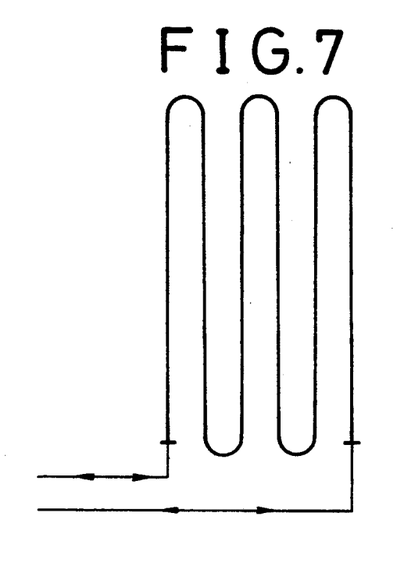
FIG. 7 is a schematic view of a still further holding column useful in the practice of this invention and having U-shaped, forward and backward flow passages.

FIG. 7 is a schematic illustration of the fourth example of the holding column (hereinafter referred to as "the fourth holding column"). The fourth holding column is constructed of a tubular hollow body including U-shaped, forward and backward flow passages. The overall length and internal volume of the forward and backward flow passages are L and V, respectively.

Figure 8:
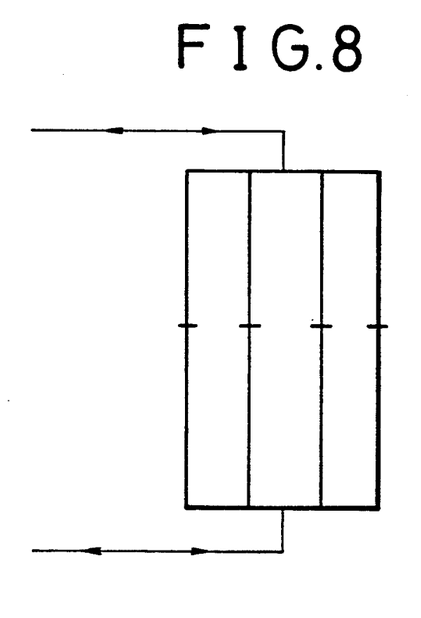
FIG. 8 is a schematic view of a still further holding column useful in the practice of this invention and having 4 rows of tubular hollow bodies.

FIG. 8 is a schematic illustration of the fifth example of the holding column (hereinafter referred to as "the fifth holding column"). The fifth holding column is constructed of four rows of tubular hollow bodies. The mark which is placed at approximately the midpoint of each row indicates an orifice or a perforated disk disposed at the intermediate point of the tubular hollow body with a view toward avoiding channeling of gas. In the fifth holding column, the length and internal volume of the tubular hollow body in each row are L and V, respectively.

The holding columns illustrated in FIGS. 6 to 8 are each provided with gas spreaders at gas inlets and outlets thereof formed both ends, respectively.

Figure 9:
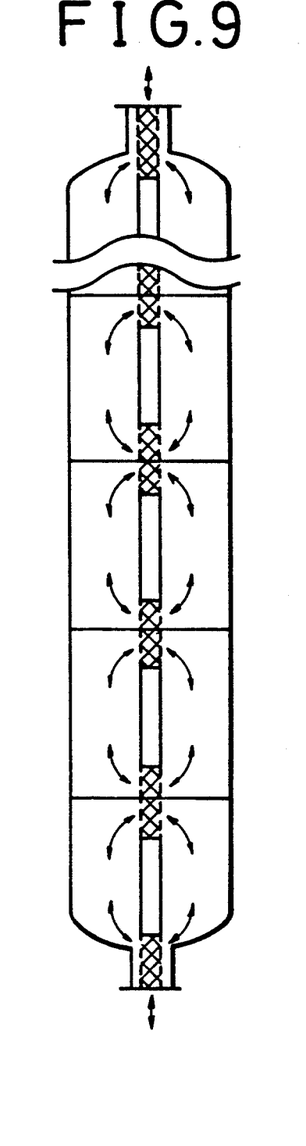
FIG. 9 is a schematic view of a still further holding column useful in the practice of this invention and having small compartments arranged in series.

A sixth example of a holding column, which has small compartments divided from one another and arranged in series, is next described concerning FIG. 9.

The small compartments have been formed by dividing the interior of large tube. Cylindrical gas spreaders are arranged at both ends of tube and at central parts of partition walls dividing the small compartments. In the illustrated example, the respective gas spreaders are supported by corresponding hollow cylinders by which the gas spreaders are connected. Such supports may, however, be eliminated. In the illustrated example, N is the total number of the small compartments. Each gas spreader is provided, for example, with a number of small apertures, so that the gas contained inside the upstream one of the adjacent small compartments is mixed at the position of the gas spreader and is then allowed to flow into the downstream small compartment. The arrows indicate gas flow passages.

The upright cylindrical holding columns have been described concerning FIGS. 4(a) to 9. Needless to say, they can be modified into a horizontal configuration or a square cross-section.

The present invention can be applied to various cases in each of which one or more impurities are selectively separated from a gaseous mixture to obtain a product gas having a high purity. The present invention is particularly suitable for obtaining a gaseous product with a relatively high impurity concentration (several hundreds ppm or higher) from refinery off-gas, ethylene plant off-gas or steam reforming gas.

In the present invention, further, the concentration of an impurity in a gaseous product can be controlled by monitoring the concentration gradient of the impurity in purge gas to determine the composition of the purified gas and, if necessary, modifying the cycle time to control the concentration gradient of purge gas in advance. Such modifications of the cycle time can be effected either manually or by automatic control.

The gas to be treated according to the process of the present invention is a mixture composed of hydrogen gas and at least one gaseous impurity to be eliminated. Examples of the gaseous impurity include methane, gaseous hydrocarbons other than methane, carbon dioxide and carbon monoxide.

The gas separation process according to the present invention will next be described concerning FIGS. 1 to 3 of the accompanying drawings.

Figure 1:
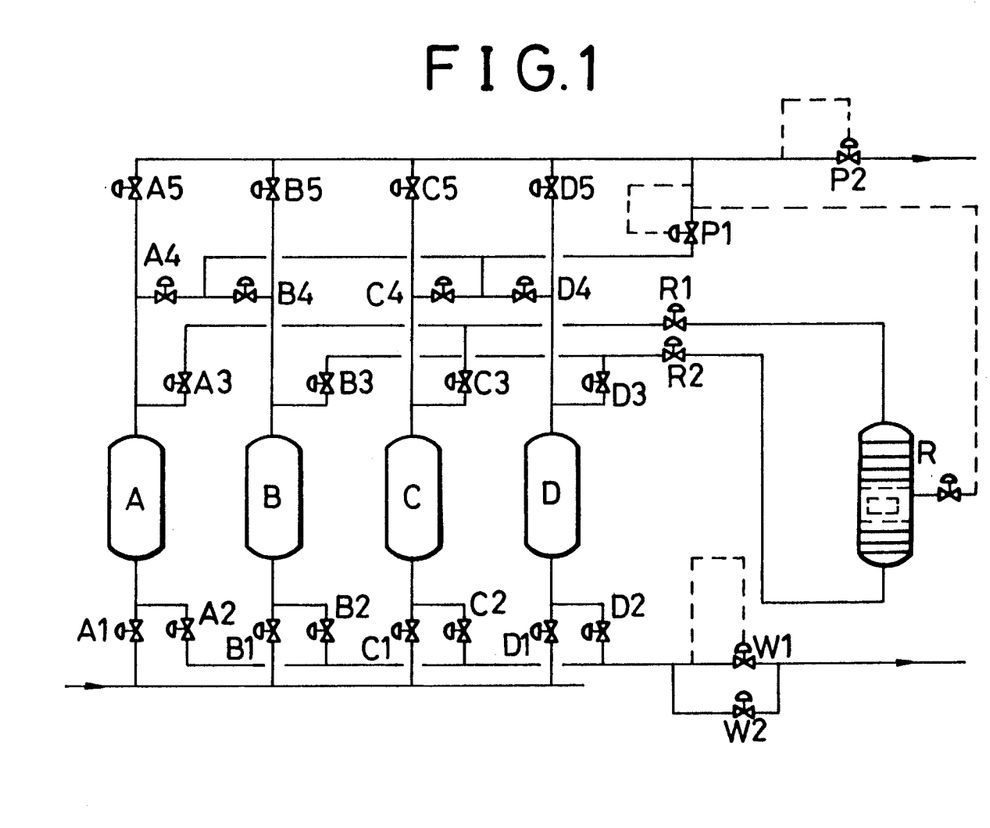
FIG. 1 is a flow sheet for practicing the process of this invention.

FIG. 1 is a flow sheet of the process of the present invention as practiced using four adsorption columns and one holding column. Principal elements shown in the drawing are as follows:

A-D: adsorption columns,
R: holding column,
A1, B1, C1 and D1: inlet valves for gas to be treated,
A2, B2, C2 and D2: off-gas purge valves,
A3, B3, C3 and D3: communication valves to holding column,
A4, B4, C4 and D4: pressurizing or depressurizing valves,
A5, B5, C5 and D5: outlet valves for purified gases,
R1 and R2: inlet and outlet valves of the holding column, and
P1: valve for purified gas to be used for pressurization.
P2: product gas pressure control valve.
W1: dump gas flow control valve.
W2: purge gas valve.

Figure 2:
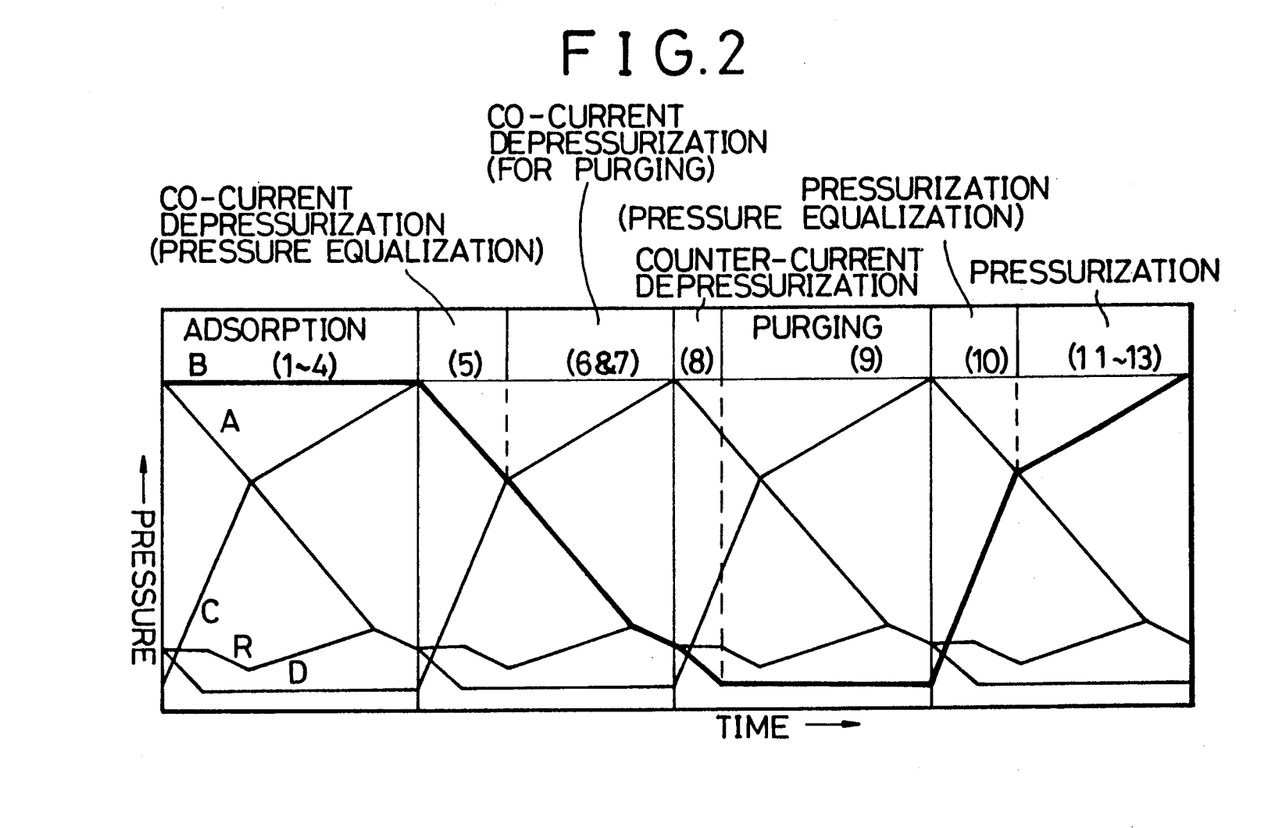
FIG. 2 is one example of a time-pressure diagram during a single cycle of steps of the process of this invention.

FIG. 2 is a time-pressure diagram showing an operation in which purge gas is not available in any amount greater than that needed.

The operation of FIG. 1 is now described step by step, highlighting the adsorption column B as the first adsorption column.

Sub-steps 1-4 (step a)

A gas to be treated is introduced under a high pressure into the first adsorption column B through the inlet valve B1 and, after adsorption of an impurity, the purified gas is discharged through the outlet valve B5. Before the adsorption column B no longer has any remaining adsorbing ability and the purity of the purified gas falls below a target level, the valves B1 and B5 are closed to finish the adsorption.

Sub-step 5 (step b)

The adsorption column B is depressurized through the valve B4. Gas flowing out of the adsorption column B is used to raise the pressure of another adsorption column D.

Sub-step 6

The adsorption column B is depressurized further through the valve B3. Gas flowing out of the adsorption column B is fed to the holding column through the valve R2. This procedure is continued until the breakthrough of the impurity begins to take place in the gas flowing out of the adsorption column B.

Sub-step 7 (sub-steps 6 and 7 corresponding in combination to step c)

The gas stored in the holding column R is forced out by the gas, which has flowed out of the first adsorption column B and has entered the holding column R, and is then introduced into the second adsorption column A through the valves R1 and A3, whereby the impurity is purged from the second adsorption column A.

Sub-step 8 (step e)

The valve B3 is closed and the valve B2 is opened instead, whereby the internal pressure of the adsorption column B is lowered to a lowest level to desorb the impurity.

Sub-step 9 (step f)

The gas stored in the holding column R is forced out by gas, which has flowed out of the third adsorption column C and has entered the holding column R, and is then introduced into the first adsorption column B through the valves R2 and B3, whereby the impurity is purged from the first adsorption column B.

Sub-step 10 (step h)

Gas, which has flowed out of the fourth adsorption column D to depressurize the column D, and a portion of purified gas is introduced into the first adsorption column B through the valve B4, so that the internal pressure of the first adsorption column B is raised.

Sub-steps 11-13 (step i)

A portion of the purified gas is introduced into the first adsorption column B through the valves P1 and B4, whereby the first adsorption column B is pressurized to an adsorbing pressure.

Figure 3:
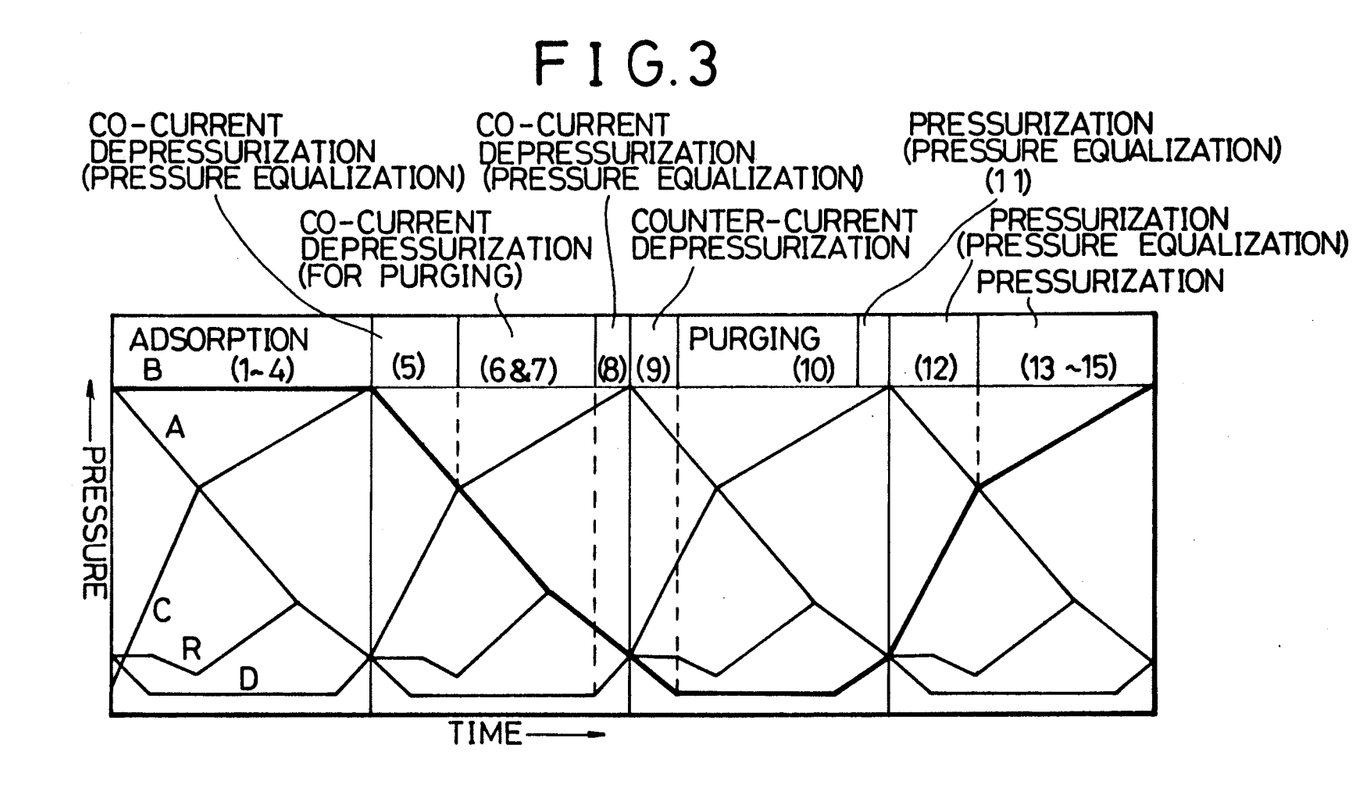
FIG. 3 is another example of a time-pressure diagram during a single cycle of steps of the process of this invention.

FIG. 3 is a time-pressure diagram showing an operation in which purge gas is available in an amount greater than that needed and the extra purge gas is used for pressurizing the adsorption columns again.

The operation of FIG. 3 is now described step by step, highlighting the adsorption column B as the first adsorption column.

Sub-steps 1-4 (step a), sub-step 5 (step b) and substeps 6-7 (step c) are similar to the corresponding substeps in FIG. 2.

Sub-step 8 (step d)

A purge valve A2 of the second adsorption column A is closed, whereby the adsorption column B is equalized again in pressure with the adsorption column A by extra purge gas from the adsorption column B.

Sub-steps 9 (step e) and 10 (step f) corresponding to sub-steps 8 and 9 in FIG. 2 and are similar thereto, respectively.

Sub-step 11 (step q)

The purge valve B2 of the adsorption column B is closed, whereby the adsorption column C is equalized again in pressure with the adsorption column B by extra purge gas from the adsorption column C.

Sub-steps 12 (step h) and 13-15 (step i) correspond to sub-steps 10 and 11-13 in FIG. 2 and are similar thereto, respectively.

The process of the present invention has been described using four adsorption columns by way of example. It is, however, unnecessary to limit the number of adsorption columns to four. For example, the time required for adsorption in each adsorption column can be shortened by using at least 5 but not more than 8 adsorption columns, varying the number of adsorption column or columns to be fed with gas, which is to be treated, to make constant the total flow rate of the gas to be treated and that of the purified gas, and suitably varying the velocity of gas passing through each of the adsorption columns. Further, by using six adsorption columns, for example, it is also possible to conduct operation according to the time-pressure diagram depicted in FIG. 10.

In the process of the present invention, when gas is fed into the holding column or flowed out from the holding column by communicating the holding column to any one of the adsorption columns, the gas concentration attribution in the direction of the length of the flow passage must retain the attribution. For this purpose, it is desirable to conduct the operation so that the average linear gas velocity is controlled at least at 0.5 cm inside the holding column.

Dispersion of a gaseous impurity in gas taken place is primarily based on mixing of the gas and molecular dispersion of the gaseous impurity. On the other hand, when the holding column is an unpacked column, the dispersion based on mixing of gas can be reduced by increasing $L^3/V$ or reducing the linear gas velocity. Although the effect of the molecular dispersion of gas is smaller than that of the dispersion based on mixing of gas, selection of a large value as the length L of the flow passage has been found desirable for the reduction of the effect of the molecular dispersion. It has been found undesirable to lower the linear gas velocity in the holding column extremely.

In one embodiment of practice of the process according to the present invention, the holding column can be packed in part. For instance, packings can be filled in the inlet and outlet of the holding column to serve as gas spreaders.

Examples of the present invention will hereinafter be described concerning some of the accompanying drawings.

EXAMPLE 1

Using the gas separation system of the flow sheet shown in FIG. 1, separation of gases was conducted according to the operation based on the diagram shown in FIG. 2.

The composition (percentage by dry volume basis) of a gaseous mixture treated was as follows:

$H_2$: 72.5, $CH_4$: 19, $C_2H_6$: 5, $C_3H_8$: 2, n-$C_4H_{10}$: 1, n- and i-$C_5H_{12}$: 0.5

The gaseous mixture was introduced at the pressure of 29 kg/cm$^2$ (absolute) and the flow rate of 1650 Nm$^3$/hr at 30° C. into the separation system of FIG. 1. As a result of the separation, purified gas consisting of hydrogen of at least 99.99 vol. % purity was obtained at the flow rate of 993 Nm$^3$/hr. That is, about 83% of the hydrogen gas in the gaseous mixture so treated was recovered as the purified gas. The cycle time was 24 minutes and off-gas was released at the pressure of 1.3 kg/cm$^2$ (absolute).

Each of four adsorption columns was a column of 0.7 m in diameter and 5.0 m in height. The upper three quarters of each column was packed with active carbon having an average particle size of 2.5 mm and the lower one quarter was packed with silica gel having an average particle size of 1-2 mm. The holding column was a column having the structure of FIG. 4, and was 1.0 m in diameter and 3.8 m in height.

EXAMPLE 2

A gas separation system whose flow sheet is shown in FIG. 1 is used and separation of gases was conducted according to the operation illustrated in FIG. 3.

The composition (percentage by dry volume basis) of a gaseous mixture treated was as follows:

$H_2$: 72.5, $CH_4$: 19, $C_2H_6$: 5, $C_3H_8$: 2, n-$C_4H_{10}$: 1, n- and i-$C_5H_{12}$: 0.5

The gaseous mixture was introduced at the pressure of 29 kg/cm$^2$ (absolute) and the flow rate of 1650 Nm$^3$/hr at 30° C. into the separation system of FIG. 1. As a result of the separation, purified gas consisting of hydrogen of at least 99.99 vol. % purity was obtained at the flow rate of 29 Nm$^3$/hr. That is, about 86% of the hydrogen gas in the gaseous mixture so treated was recovered as the purified gas. The cycle time was 24 minutes and off-gas was released at the pressure of 1.3 kg/cm$^2$ (absolute). Each of four adsorption columns was a column of 0.7 m in diameter and 5.0 m in height. The upper three quarters of each column was packed with active carbon having an average particle size of 2.5 mm and the lower one quarter was packed with silica gel having an average particle size of 1-2 mm. The holding column was a column having the structure of FIG. 4, and was 0.95 m in diameter and 4 m in height.

EXAMPLE 3

Figure 10:
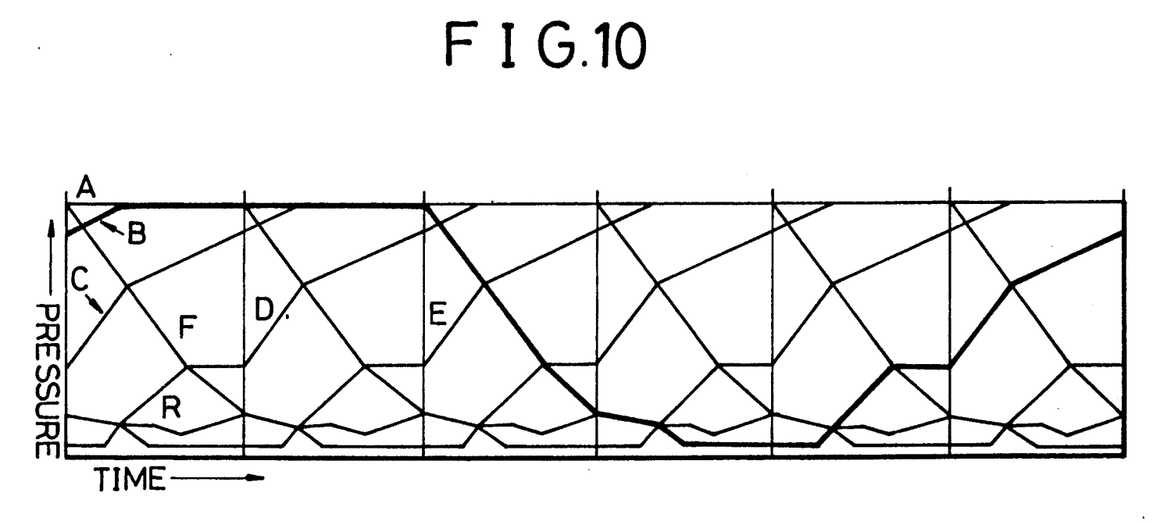
FIG. 10 is another example of a time-pressure diagram during a single cycle of steps of the process of this invention.

Using a gas separation system of the flow sheet shown in FIG. 1 except for the inclusion of 6 adsorption columns, separation of gases was conducted according to the operation depicted in FIG. 10. Comparing FIG. 10 to FIG. 3 in which four columns were used, it will be seen that two columns were simultaneously employed to conduct adsorption in the adsorption step. Further, the pressure equalization with another adsorption column was increased from once to twice.

The composition (percentage by dry volume basis) of a gaseous mixture treated was as follows:

$H_2$: 76.5, $CH_4$: 16, $C_2H_6$: 4, $C_3H_8$: 2, n-$C_4H_{10}$: 1, n- and i-$C_5H_{12}$: 0.5

The gaseous mixture was introduced at the pressure of 29 kg/cm$^2$ (absolute) and the flow rate of 4650 Nm$^3$/hr at 30° C. into the separation system. As a result of the separation, purified gas consisting of hydrogen of at least 99.99 vol % purity was obtained at the flow rate of 3095 Nm$^3$/hr. That is, about 87% of the hydrogen gas in the gaseous mixture so treated was recovered as the purified gas. The cycle time was 13 minutes and off-gas was released at the pressure of 1.3 kg/cm$^2$ (absolute)

Each of six adsorption columns was a column of 0.9 m in diameter and 5.0 m in height. The upper three quarters of each column was packed with active carbon having an average particle size of 2.5 mm and the lower one quarter was packed with silica gel having an average particle size of 1-2 mm. The holding column was a column having the structure of FIG. 4, and was 1.0 m in diameter and 3.8 m in height.

EXAMPLE 4

Using a gas separation system of the flow sheet shown in FIG. 1 except for the inclusion of 8 adsorption columns, separation of gases was conducted basically following an operation analogous to the operation illustrated in FIG. 10. Compared to FIG. 10 in which six columns were used, it will be seen that three columns were simultaneously employed to conduct adsorption in the adsorption step. Further, the pressure equalization with another adsorption column was increased from twice to three times.

The composition (percentage by dry volume basis) of a gaseous mixture treated was as follows:
$H_2$: 76.5, $CH_4$: 16, $C_2H_6$: 4, $C_3H_8$: 2, n-$C_4H_{10}$: 1, n- and i-$C_5H_{12}$: 0.5

The gaseous mixture was introduced at the pressure of 29 kg/cm$^2$ (absolute) and the flow rate of 8611 Nm$^3$/hr at 30° C. into the separation system. As a result of the separation, purified gas consisting of hydrogen of at least 99.99 vol. % purity was obtained at the flow rate of 5863 Nm$^3$/hr. That is, about 89% of the hydrogen gas in the gaseous mixture so treated was recovered as the purified gas. The cycle time was 12 minutes and off-gas was released at the pressure of 1.3 kg/cm$^2$ (absolute)

Each of eight adsorption columns was a column of 1.0 m in diameter and 4.5 m in height. The upper three quarters of each column was packed with active carbon having an average particle size of 2.5 mm and the lower one quarter was packed with silica gel having an average particle size of 1-2 mm. The holding column was a column having the structure of FIG. 4, and was 0.95 m in diameter and 4 m in height.

What is claimed is:

1. A process for separating gaseous impurities from a gaseous mixture by using a multiplicity of adsorption columns containing adsorbents, thereby to obtain a purified gas; the process including repeating alternate, cyclic adsorption and desorption as to at least three of the adsorption columns, which comprises the following steps a to i:

a) feeding the gaseous mixture into a first adsorption column through an inlet thereof, discharging the purified gas through an outlet of the first adsorption column, and terminating the feeding and discharging before the first adsorption column has no remaining adsorbing ability any longer and the purity of the purified gas falls below a target level;

b) communicating an outlet of at least one other adsorption column, whose adsorbent has been regenerated, to the outlet of the first adsorption column already subjected to the step a, whereby both the adsorption columns are equalized in pressure, and then eliminating the communication;

c) communicating the outlet of the first adsorption column, which has been subjected to step b, to a first end of a holding column which is a feed-in/feed-out sequence retaining type and contains a gas received as a result of communication of a second end of the holding column with at least one outlet of the other adsorption columns having been subjected to steps a and b like the first adsorption column, whereby the gas inside the first adsorption column is allowed to enter the holding column until the breakthrough of the components adsorbed on the adsorbent bed of the first adsorption column begins to occur in the gas; and, during the entrance of the gas from the first adsorption column into the holding column, maintaining the second end of the holding column in communication with an outlet of a second adsorption column already subjected to steps a, b and c and also to the below-described step e, whereby the second adsorption column is purged with the gas forced out of the holding column by the gas flowed into the holding column, the last-mentioned gas optionally containing a portion of the purified gas as needed;

d) closing a purge valve of the second adsorption column as needed, whereby the second adsorption column and the first adsorption column are communicated to each other and equalized in pressure, and then eliminating the communication;

e) closing the outlet of the first adsorption column already subjected to step c or d and depressurizing the first adsorption column to a lowest pressure by a purge valve provided on the side of the inlet of the first adsorption column, whereby the components adsorbed on the adsorbent bed of the first adsorption column is desorbed and eliminated;

f) communicating an outlet of a third adsorption column, which has been subjected to steps a and b like the first adsorption column, to the second end of the holding column, whereby the gas inside the third adsorption column is allowed to enter the holding column until the breakthrough of the components adsorbed on the adsorbent bed of the third adsorption column begins to occur in the gas, said gas entering the holding column optionally containing a portion of the purified gas as needed; and, during the entrance of the gas from the third adsorption column into the holding column, maintaining the first end of the holding column in communication with the outlet of the first adsorption column already subjected to step e, whereby the first adsorption column is purged with the gas forced out of the holding column by the gas flowed into the holding column, the last-mentioned gas optionally containing a portion of the purified gas as needed;

g) closing the purge valve of the first adsorption column as needed, whereby the first adsorption column and the third adsorption column are communicated to each other and equalized in pressure, and then eliminating the communication;

h) communicating the outlet of at least one other absorption column, which has been subjected to step a or steps a and b like the first adsorption column, to the outlet of the first adsorption column, which has been subjected to step f or g, while closing both an inlet of said at least one other adsorption column and the inlet of the first adsorption column, whereby the gas inside said at least one other adsorption column is allowed to enter the first adsorption column, the last-mentioned gas optionally containing a portion of the purified gas as needed, to subject both said at least one other adsorption column and the first adsorption column to at least one pressure equalizing operation, and then eliminating the communication; and i) causing a gas of the same quality as the purified gas to flow into the first adsorption column, which has been subjected to step h, through the outlet thereof while closing the inlet thereof, whereby the pressure of the first adsorption column is equalized with that of the gas of the same quality as the purified gas, and then closing the outlet of the first adsorption column;

wherein said holding column comprises one or a combination of the following structures:

j) at least one row of spaces divided by partition walls and arranged in series;

k) at least one hollow body; and l) at least one row of divided compartments arranged in series; and where the holding column is either said j or k, the holding column has $L^3/V$ of at least 200, L being the length of the flow passage of the holding column as expressed in terms of meters (m) and V being the volume of the flow passage of the holding column as expressed in terms of cubic meters ($m^3$); and, where the holding column is said l, the total number (N) of the divided compartments in each row is at least 20.

2. The process of claim 1, wherein the time required for the adsorption of the impurities in each adsorption column is shortened by employing at least 5 but not more than 8 adsorption columns, varying the number of adsorption column or columns to be fed with the gaseous mixture to make constant the total flow rate of the gaseous mixture and that of the purified gas, and varying the velocity of gas passing through each of the adsorption columns.

3. The process of claim 1, wherein the average linear gas velocity inside the holding column is at least 0.5 cm when the holding column is communicated with any one of the adsorption column to allow the gas to enter the holding column or to flow out of the holding column.

4. The process of claim 1, wherein the holding column is partially packed with a packing.

5. The process of claim 1, wherein the purified gas is a gaseous mixture which contains hydrogen gas.

* * * * *